United States Patent [19]

Masucci

[11] 4,334,741
[45] Jun. 15, 1982

[54] MELDING MASK

[75] Inventor: Carmine Masucci, Eastchester, N.Y.

[73] Assignee: Izon Corporation, New York, N.Y.

[21] Appl. No.: 72,928

[22] Filed: Sep. 6, 1979

[51] Int. Cl.³ .............................................. G03B 21/11
[52] U.S. Cl. ...................................... 353/38; 353/102
[58] Field of Search ................. 353/38, 102, 120, 121, 353/122, 25

[56] References Cited

U.S. PATENT DOCUMENTS 3,712,724 1/1973 Pratt .................................. 353/38 X
3,853,395 12/1974 Yevich .............................. 353/38 X

FOREIGN PATENT DOCUMENTS 814165 6/1969 Canada ................................... 353/38
466089 2/1914 France ................................... 353/38

Primary Examiner—Harry N. Haroian
Attorney, Agent, or Firm—Daniel M. Rosen

[57] ABSTRACT

A distributed-optical microfiche reader provided with a lens matrix formed by an array of equidistant individual lenslets, each optically in registration with a respective bit of information in the dissected image pattern selected for projection onto a screen. Each lenslet is separately irradiated and serves to enlarge the related bit and to project it onto a respective screen zone.

3 Claims, 9 Drawing Figures

MELDING MASK

BACKGROUND OF INVENTION

This invention relates generally to distributed-optical microfiche readers, and more particularly to a reader of this type that includes an apertured melding mask adapted to effect uniform illumination of the selected image projected on the screen.

In a conventional microfiche storage and retrieval system, individual frames each bearing a reduced scale image of a single document or page of stored intelligence are arranged in a grid formation on a single record sheet or card. This species of microfiche requires a reader in which a selected frame on the microfiche is illuminated and aligned with a single-axis optical system for projection onto a viewing screen.

A single-axis optical system reader has a number of inherent limitations including the need for a minimum of 12 to 17 inches projection distance from the lens to the screen. This materially restricts the potential for reader size and weight reduction. But even if a reader for a conventional microfiche could be made more compact, it is subject to hot-spot overlighting at the center of the screen. This nonuniformity in screen illumination causes eye fatigue, it dictates relatively high power inputs and thereby generates troublesome amounts of heat. Moreover, image resolution and lighting at the corners of the viewing screen are degraded.

The limitations characteristic of conventional microfiche readers have arrested the spread of micrographic technology into many application areas that require portability, maximum user convenience and image readability unaccompanied by eye fatigue.

The serious drawbacks inherent in existing types of microfiche readers have in large measure been overcome by a distributed-optical information storage and retrieval system of the type disclosed in the Waly U.S. Pat. No. 3,704,068 and in the Yevick Pat. Nos. 3,907,420 and 3,864,034, among others, all of which are assigned to the same assignee as the instant application.

In a distributed-optical information storage and retrieval system, the pages of data or intelligence are not recorded in discrete frames as in a conventional microfiche, but are dissected and interlaced thereon to produce a multipage record which is read back by enlarging only that pattern of dispersed characters or bits which together constitute the data of the single recorded page selected for projection.

Instead of a single-axis optical system, use is made of any array of individual lenslets (of the order of 500) which function in parallel, each serving only its own small cell or zone on the viewing screen. Because each individual lenslet acts to project only a tiny piece of the total image onto a respective zone, the projection distance to the screen is reduced to little more than an inch. Thus, the dimensions and weight of the reader can be made to be no greater than that of an average telephone book, thereby affording both full portability and the convenience of either a desk top or lap reader.

In a distributed-optical reader of the type disclosed in the above-identified patents, the microfiche is place in parallel relation to a lens matrix having an array of lenslets each of which is aligned with a respective bit of information on the microfiche to enlarge and project this bit onto a respective screen zone. In some instances, the lens matrix and the microfiche are integrated to form a unitary structure.

Illumination of the microfiche is effected by a cluster of fiber optic light pipes whose inputs are all irradiated by a common light source and whose outputs are in registration with the optical axes of the array of lenslets so that each optical path in the distributed optical system is separately illuminated. Interposed between the lens matrix and the screen and parallel therewith is an apertured mask acting to inhibit the overlap of adjacent information.

In a distributed-optical reader of this type, the light inputs to the several lenslets in the array are of about equal intensity. Consequently, the aggregate light fluxes in the related screen zones are substantially equal. But the intensity of light at any one point within a given zone, say, at zone center, is quite different from the light intensity at a point displaced from center. These zonal differences are governed by certain factors which will be later analyzed.

Hence, while a distributed-optical microfiche reader of the type heretofore known does not suffer from hot-spot overlighting at the center of the screen and all its attendant disadvantages, the screen lighting is not uniform and the illuminated image on the screen has a honeycomb appearance in which each illuminated cell or zone is separately discernible, rather than an image having a uniformly-illuminated seamless form. This honeycomb appearance, which is attributable to the lack of uniform light intensity within each zone forming the total image, though it does not seriously impair the readability of the image, is nevertheless distracting and constitutes a disturbing imperfection. In prior patent to S. Rosin, entitled Distributed-Optical Microfiche Reader, U.S. Pat. No. 4,134,650, issued Jan. 16, 1979, and assigned to the assignee of the present invention, the use of a melding mask to provide more uniform light distribution is disclosed. The melding mask concept disclosed therein, while providing definite improvement over a system without such masks, still provided images with imprecisions and evidence of uneven illumination.

SUMMARY OF INVENTION

In view of the foregoing, it is the main object of this invention to provide a distributed-optical microfiche reader which produces a uniformly-illuminated screen image in substantially seamless form, even though the screen image is composed of separately-illuminated individual zones.

More particularly, an object of the invention is to provide a reader of the above-type which includes an apertured melding mask that not only serves to inhibit overlap of information but also functions to bring about substantially equal light intensity at every point in the array of zones forming the total screen image.

Briefly stated, these objects are attained in a distributed-optical microfiche reader provided with a lens matrix formed by an array of equidistant individual lenslets, each optically in registration with a respective bit of information in the dissected image pattern selected for projection onto a screen. Each lenslet is separately irradiated and serves to enlarge the related bit and to project it onto a respective screen zone.

It has been discovered that a dramatic improvement in illumination is achieved without the mask when a condensing lens plate is interposed between the illumination source and the array of lenslets. Further improvement is realized when an apertured melding mask having an array of openings corresponding to the array of lenslets and optically aligned therewith is interposed between the illumination source and the condensing lens plate which is optically aligned to the array of lenslets. Each irradiated lenslet produces a bundle of rays that is limited by the lenslet aperture, the diameter of the mask opening relative to that of the lenslet aperture and the distance between the opening and the lenslet being such that the illuminated screen zones associated with each triad of directly adjacent lenslets are in overlapping relationship to produce substantially equal light intensities within the overlapping and non-overlapping regions therein, thereby uniformly illuminating the screen.

OUTLINE OF DRAWINGS

For a better understanding of the invention as well as other objects and further features thereof, reference is made to the following detailed description to be read in conjunction with the accompanying drawings, wherein:

FIG. 1 schematically illustrates a distributed-optical microfiche reader which includes a melding mask in accordance with the invention;

DESCRIPTION OF INVENTION

Figure 1:
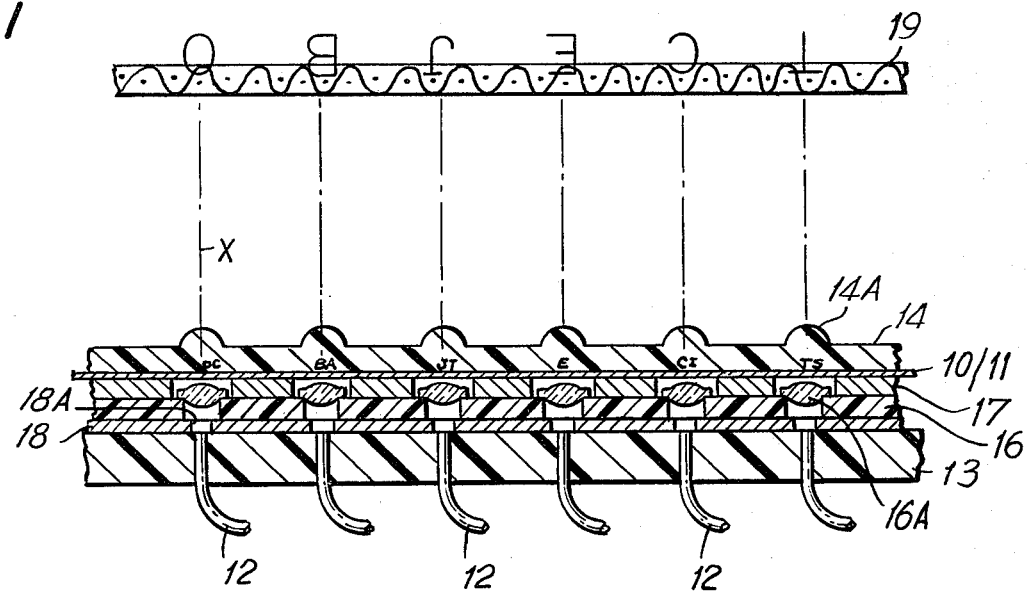

Referring now to FIG. 1, there is shown a distributed-optical microfiche reader in accordance with the invention for projecting a selected image recorded on a multi-image microfiche. The microfiche is formed by a photographic emulsion 10 carried on a transparent plate 11 made of clear plastic such as methyl methacrylate. The physical form of the distributed-optical microfiche forms no part of the present invention which is directed to a reader usable with any of the microfiche structures disclosed in the patents assigned to the assignee herein.

Illumination is provided by a cluster of fiber optic light-conducting tubes or pipes 12 whose input terminals are all irradiated by a common light source (not shown) and whose output terminals are supported by a base plate 13 disposed in parallel relation to the microfiche carrier plate 11, whereby each light output terminal lies in registration with a respective optical axis of the distributed-optical projection system.

The lens system also includes a lens matrix 14, including lenslets 14A, a condenser support plate 16, condenser lenses 16A and an upper pad 17.

A planar melding mask 18 is mounted parallel to the lens system, between the upper surface of the plate 13 and the condenser lens plate 16. The upper surface of lens matrix 14, which may be molded or otherwise fabricated of clear plastic material having an index of refraction of $\approx 1.5$, has an array of equi-spaced convex protuberances 14A embossed thereon, each protuberance defining a distinct lenslet. These lenslets 14A serve to enlarge and project onto the rear surface of a screen 19 all of the irradiated data bits in the selected microfiche pattern to produce a viewable illuminated image on the screen. Mask 18 is provided with an array of openings 18A corresponding to the array of lenslets and in optical registration therewith.

As explained previously, in a distributed-optical microfiche, each recorded page is dissected to form a pattern of dispersed characters or data bits, the various page patterns being interlaced to occupy distinct positions on the recording medium. This is illustrated in FIG. 1 in highly simplified form, wherein the recorded page on the microfiche selected for projection, includes the word OBJECT, whose letters or bits are distributed at spaced positions along microfiche emulsion 10. Another record page (not shown) contains the words CAT IS, and the letters or bits of these words are also carried along emulsion 10 at positions slightly displaced from the letters of the first page.

In operating the reader, the microfiche is inserted between the lens matrix 14 and upper pad 17. Then the light source is energized and the microfiche is indexed to cause the selected image pattern to lie in registration with the optical projection system so that the letters OBJECT are projected. Light passes from light pipes 12 through the openings 18A in the mask 18, and through emulsion 10 which carries the intelligence. In this way the letters OBJECT are projected onto screen 19. In order to view the pattern representing the next page of recorded information on the microfiche, the microfiche is moved to the left by an indexing mechanism, thereby aligning the letters (bits) of CAT IS with the array of lenslets, and projecting this page (not shown) onto the screen.

Figure 2:
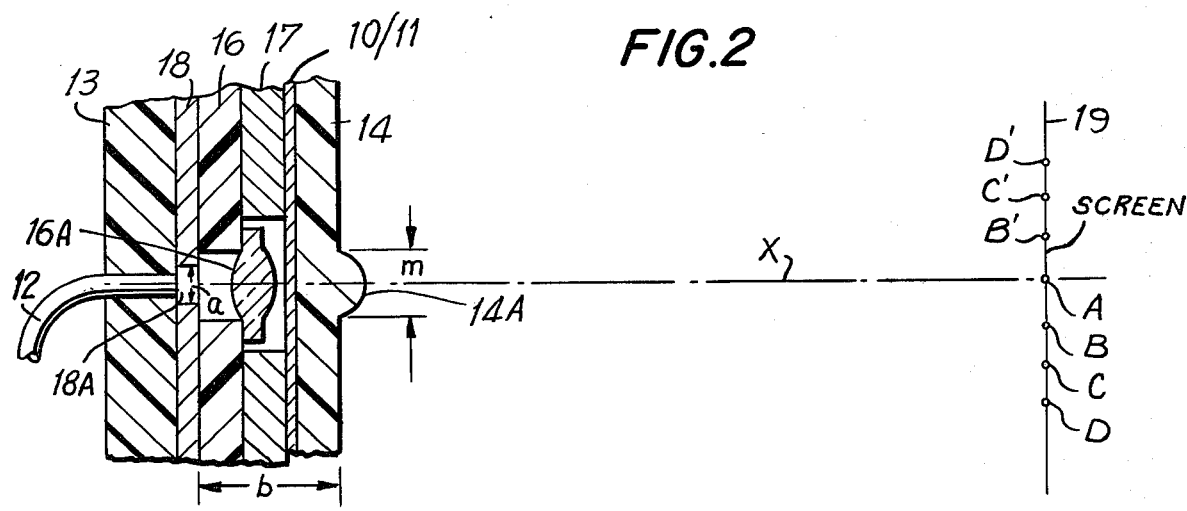
FIG. 2 illustrates the relationship existing between one opening in the mask and the aperture of a lenslet in the lens matrix included in the reader.

In connection with FIG. 2, the projection of a single bit on microfiche 10 occurs through a lenslet 14A on lens matrix 14, the bit being illuminated by a fiber optical light pipe 12. The illumination is masked by openings 18A in mask 18, concentrated by the condenser lens 16A through the film 10, and filling the aperture of lenslet 14A which projects the image to the rear surface of screen 19. Lenslet 14A, condenser lens 16A and mask opening 18A are in axial alignment, the optical axis X passing through the bit on the microfiche.

The mask 18 has an aperture 18A of a given diameter "a," the bundle of light rays being limited by this aperture width and by its depth, and concentrated by the condenser lens 16A. The lenslet 14A has a given diameter (aperture) "m."

Referring now to FIG. 2A, the relationship of mask aperture "a" to lenslet opening "m" is shown as it appears to the eye of an observer looking at screen 16 at an image point A thereon intersected by optical axis X. Image point A is at a zero field angle so that aperture "a" is seen to the observer as perfectly centered within aperture "m." The light rays from aperture "a" in this viewing position are in no way obscured by opening "m."

Image point B on screen 19 is slightly displaced from the zero field angle image point A, and the image point B is therefore at a slight field angle. The eye of the observer at image point B now sees the illuminated aperture "a," as shown in FIG. 3B, somewhat off-center with respect to opening "m" but still within this opening; hence the optical path is still at maximum intensity through the lenslet.

Figure 3A:
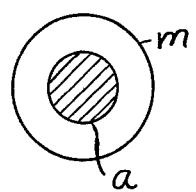
FIGS. 3A, 3B, 3C and 3D show the relationship between the lenslet aperture and the mask opening as seen by an observer at different field angles on the reader screen.
Figure 3B:
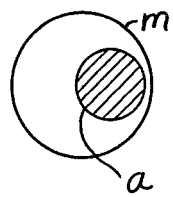
Figure 3C:
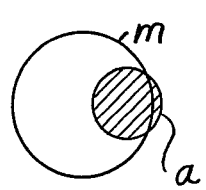
Figure 3D:
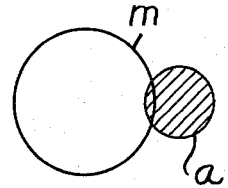

But with a further displacement at image point C, the eye of the observer sees most of aperture "a," for now opening "m" partially obscures a minor portion of the light passage, as shown in FIG. 3C. A further displacement at image point D, which represents a relatively large field angle, causes opening "m" to almost fully obscure the light from aperture "a."

Figure 4:
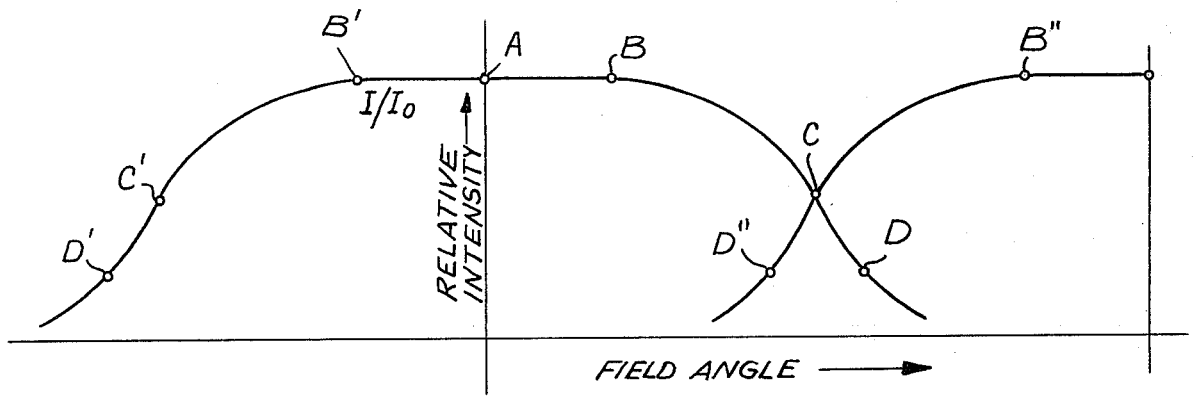
FIG. 4 is a curve showing the relationship between relative light intensity and field angle.

By plotting the light intensity of the rays from aperture "a," as indicated by the cross-hatched area within opening "m" in FIGS. 3A, B and C, as against the field angle at image points A, B, C and D, one produces the graph illustrated in FIG. 4 which shows that the relative intensity $I/I_o$ is at its maximum level at points A and B. This intensity falls off at point C and drops sharply at point D.

As is well known, the light intensity in photographic and projection systems varies as the fourth power of the cosine of the angle of obliquity. This is the obliquity factor $\cos^4\theta$. Furthermore, in the context of a reader arrangement in accordance with the invention, the light intensity at image points A, B, C and D, as one goes from a zero field angle to a relatively wide field angle, depends not only on the obliquity factor, but also on the directional characteristics of the screen. The screen directionality factor $S_\theta$ represents the ratio of screen intensity relative to its value at 0°.

The third factor which comes into play is the area factor $A_\theta$. As explained previously in connection with FIGS. 2 and 3, the area of the lenslet aperture "m" that is available for the passage of light depends on the diameter "a" of the mask opening and its distance "b" from the lenslet. If the diameter and position of mask opening "a" are known, the value of the area $a_\theta$ can be calculated, and the ratio $A_\theta = a_\theta/a$ can be determined for any obliquity $\theta$.

Thus the intensity of light $I_\theta$ from a single lenslet 14A at any angle of obliquity $\theta$ is determined by three factors and is expressed by the following equation:

$$(I_\theta/I_O) = A_\theta \cdot S_\theta \cos^4 \theta \qquad \text{Equation (1)}$$

Figure 5:
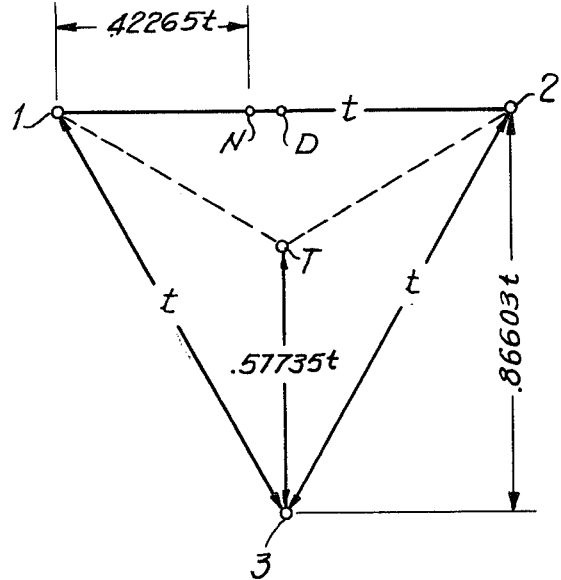
FIG. 5 illustrates a triad of three directly adjacent lenslets.

We shall now, in connection with FIG. 5, consider a triad of three closely adjacent lenslets in the lens matrix. The centers of these lenslets lie at the corners 1, 2 and 3 of an equilateral triangle. The distance between the centers of any two lenslets in the triad is designated 6. The triple-point of the triad which is equidistant from all lenslets is designated T, whereas the double-point which lies midway between two lenslets is designated D. Test point N is at a position along the line between lenslets 1 and 2 and is spaced from lenslet 2 by a distance equal to the triple point distance T. Hence test point N is spaced from lenslet 1 by a distance equal to t minus T. Assuming that t=1, the distance between point T and any lenslet center=0.57735t, and the distance between point N and lenslet center 1=0.42265t.

If the light intensity $I_O$ on the screen directly opposite lenslet 1 is assumed to be 100%, with no light thereon from the other lenslets 2 and 3, and if one assumes that the intensity of illumination is determined only by the area factor, then in order to effect uniform illumination of the screen, the following conditions must prevail:

(A) The screen portion opposite the triple point T must receive 33⅓ from each of the three lenslets;
(B) The screen portion opposite double point D must receive 50% from each of lenslets 1 and 2; and
(C) The screen portion opposite test point N must receive 66⅔ from lenslet 1 and 33⅓ from lenslet 2.

Figure 6:
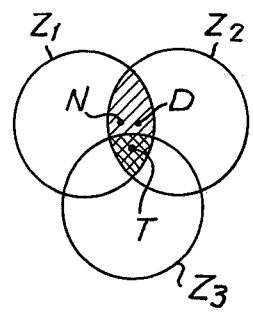
FIG. 6 illustrates the overlapping screen zones produced by the triad of lenslets.

In this way, one achieves 100% illumination in the non-overlapped portions of screen zones $Z_1$, $Z_2$ and $Z_3$ corresponding to lenslets 1, 2 and 3, as well as in the overlapping portions thereof, as shown in FIG. 6. It will be seen in FIG. 6 that all three zones $Z_1$, $Z_2$ and $Z_3$ overlap in the region surrounding triple point T, while in the region surrounding points D and N, only zone $Z_1$ and $Z_2$ overlap, all other zonal regions being free of overlap.

For any limited configuration, angles $\theta_D$ and $\theta_T$ for the double point D and triple point T, respectively, are known. Referring back to equation (1), we can obtain the two values of A at these points. For triple point T:

$$A_T = 0.333/(\cos^4\theta_T \cdot S_T)$$

For double point D:

$$A_D = 0.500/(\cos^4\theta_D \cdot S_D)$$

This gives the two relative areas at different field angles. Thus, two mathematical "degrees of freedom" in designing melding mask 18 to effect uniform screen illumination; namely, the diameter "a" of the mask opening and the axial distance "b" from this opening to the associated lenslet, as shown in FIG. 2. Consequently, one has available a solution for these quantities which will yield the required values and which can be determined by computer techniques well known in the art. Point N can be used to test the result. For point N, the relative area is given by the equation:

$$A_N = 0.677/(\cos^4\theta_N \cdot S_N)$$

Modern high speed computers make it convenient to determine the parameters of the mask that will match the triple point T and the double point D or the test point N. The procedure is to flood lenslet apertures "m" with a large number of rays equally spaced over the apertures, say, 300 rays. A mask is then placed at some arbitrary distance "b" from the lenslet, and the off-axis bundle chosen is that corresponding to triple point T.

The diameter "a" of the mask opening is adjusted so that the proper number of rays is passed by the mask. With an original number of 300 rays, the mask should pass 100 rays at triple point T, modified by an allowance for $\cos^4\theta$ fall-off and for screen directionality, both of which factors serve to increase by calculable amounts the number of rays to be passed. In other words, if the only factor were the area factor, then the three overlapping zonal regions at point T would provide $100 \times 3 = 300$, which is 100% illumination.

After diameter "a" has been adjusted to pass the proper number of rays, the field angles are adjusted either to point D or point N and similar counts are made. The ray number required at double point D would be 150, and that at point N, 200 (both with similar modification to allow for the obliquity and screen directionality factors).

Should the number of rays passed at points D or N appear to be incorrect, a new distance "b" is chosen, a new mask opening "a" for the triple point T is determined, and a fresh test is performed at points D or N. In this manner, the triple point T can be matched correctly with one of the other points. The best determination is that which comes closest for the requirements for both points D and N. Acceptable results can be obtained empirically by trial and error for different values of "a" and "b." In practice, it is not essential that all points on the screen have precisely the same intensity of illumination, and approximate matching is adequate for most purposes in order to avoid honeycomb illumination effects.

It is possible to achieve the same effects by elimination of the mask 18 entirely. In this instance, the aperture "a" is the diameter of the light fiber 12 assuming uniform diameters for the light fibers. The space "b" can be varied by varying the thickness of the layer 16.

Exemplary dimensions are: 0.020" diameter light fiber; 0.027" diameter hole 18A, a 0.033" thick mask 18, a 0.060" condenser support plate 16, and a 0.055" pad 17. The mask 18 is made of opaque fiber glass. Other dimensions are feasible, within the scope of permissible illumination levels.

While there has been shown and described a preferred embodiment of a distributed-optical microfiche reader in accordance with the invention, it will be appreciated that many changes and modifications may be made therein without, however, departing from the essential spirit thereof.

What is claimed is:

1. A reader for displaying a distributed-optical microfiche in which each page or document of recorded intelligence is constituted by a reduced scale image thereof, dissected to form a pattern of dispersed bits, the reader comprising:
   (a) a view screen;
   (b) means for illuminating said dispersed bits of dissected information on said microfiche;
   (c) melding mask means adjoining said illuminating means, said melding mask means inhibiting overlap of information displayed on said view screen and providing substantially equal light distribution at every point in any image projected upon said view screen;
   (d) an array of condenser lenses;
   (e) microfiche carrier means;
   (f) a lens matrix formed by an array of equidistant lenslet;
   (g) a plurality of optical paths, said paths defined by the cooperation of said illuminating means, said melding mask means, said array of condenser lenses, said microfiche carrier means and said lens matrix, each of said paths traversing said illuminating means, said melding means, a respective one of said array of condenser lenses, microfiche carrier means, and a respective one of said lenslets of said lens matrix, for projection of said bits onto said view screen;
   (h) said array of condenser lenses arranged upon a planar surface, said array being interposed between said melding mask means and microfiche carrier means, each condenser lens within said array aligned with a respective one of said optical paths; and
   (i) said lens matrix being interposed between said microfiche carrier means and said view screen, each said lenslet of said lens matrix being aligned with a respective one of said optical paths.

2. The reader of claim 1 wherein said melding mask means includes an array of apertures, each said aperture placed about a respective one of said optical paths between said means for illumination and a respective one of said array of condenser lenses on the optical axis of a respective one of said lenslets.

3. The reader of claim 1, wherein said means for illumination is provided by a plurality of fiber-optic light pipes, each of said light pipes supported in and spaced from one another in a fiber plate for retaining said light pipes, said melding mask means further including a plurality of spaced apertures, each of said apertures spaced from one another so as to coincide with a respective one of said light pipes, each said optical path being further defined between a respective one of said light pipes and said view screen, and said microfiche carrier means being spaced from said array of condenser lens orthogonal to said optical paths, remote from said light pipes, so as to be interposed between said array of condenser lens and said lens matrix.

* * * * *